United States Patent
Lore et al.

(10) Patent No.: US 11,544,620 B2
(45) Date of Patent: Jan. 3, 2023

(54) SYSTEM AND METHOD FOR CONTEXT-BASED TRAINING OF A MACHINE LEARNING MODEL

(71) Applicant: United Technologies Corporation, Farmington, CT (US)

(72) Inventors: Kin Gwn Lore, Manchester, CT (US); Kishore K. Reddy, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 481 days.

(21) Appl. No.: 16/253,366

(22) Filed: Jan. 22, 2019

(65) Prior Publication Data

US 2020/0234179 A1    Jul. 23, 2020

(51) Int. Cl.
*G06N 20/00* (2019.01)
*G06N 5/02* (2006.01)

(52) U.S. Cl.
CPC .............. *G06N 20/00* (2019.01); *G06N 5/02* (2013.01)

(58) Field of Classification Search
CPC .......... G06N 20/00; G06N 5/02; G06N 5/022; G06N 3/0454; G06N 3/088; B64D 2045/0085; B64D 45/00; G05B 23/024
See application file for complete search history.

(56) References Cited

U.S. PATENT DOCUMENTS

| | | |
|---|---|---|
| 10,068,140 B2 | 9/2018 | Levkova et al. |
| 2016/0155136 A1 | 6/2016 | Zhang |
| 2017/0032246 A1 | 2/2017 | Knittel et al. |
| 2017/0357896 A1 | 12/2017 | Tsatsin et al. |
| 2018/0144243 A1 | 5/2018 | Hsieh et al. |
| 2018/0348250 A1 | 12/2018 | Desell |
| 2019/0130669 A1* | 5/2019 | Boggio ................ G05B 23/024 |

OTHER PUBLICATIONS

Guo, Yifan, et al. "Multidimensional time series anomaly detection: A gru-based gaussian mixture variational autoencoder approach." Asian Conference on Machine Learning. PMLR, 2018. http://proceedings.mlr.press/v95/guo18a/guo18a.pdf (Year: 2018).*

Dong Y, Japkowicz N. Threaded ensembles of autoencoders for stream learning. Computational Intelligence. 2018;34:261-281. https://doi.org/10.1111/coin.12146 (Year: 2018).*

(Continued)

*Primary Examiner* — Kakali Chaki
*Assistant Examiner* — Michael H Hoang
(74) *Attorney, Agent, or Firm* — Getz Balich LLC

(57) ABSTRACT

According to an embodiment of the present disclosure, a method of training a machine learning model is provided. Input data is received from at least one remote device. A classifier is evaluated by determining a classification accuracy of the input data. A training data matrix of the input data is applied to a selected context autoencoder of a knowledge bank of autoencoders including at least one context autoencoder and the training data matrix is determined to be out of context for the selected autoencoder. The training data matrix is applied to each other context autoencoder of the at least one autoencoder and the training data matrix is determined to be out of context for each other context autoencoder. A new context autoencoder is constructed.

20 Claims, 4 Drawing Sheets

(56) References Cited

OTHER PUBLICATIONS

Sarkar, Soumik, et al. "Multi-sensor information fusion for fault detection in aircraft gas turbine engines." Proceedings of the Institution of Mechanical Engineers, Part G: Journal of Aerospace Engineering 227.12 (2013): 1988-2001. (Year: 2013).*

[Item V continued] http://citeseerx.ist.psu.edu/viewdoc/download?doi=10.1.1.716.2104&rep=rep1&type=pdf.*

Wong et al. "Recurrent Auto-Encoder Model for Large-Scale Industrial Sensor Signal Analysis", Arxiv.org, Cornell University Library, Jul. 10, 2018.

EP search report for EP20152942.7 dated Jun. 19, 2020.

* cited by examiner

SYSTEM AND METHOD FOR CONTEXT-BASED TRAINING OF A MACHINE LEARNING MODEL

BACKGROUND

1. Technical Field

This disclosure relates to machine learning, and more particularly to context-based training of machine learning models.

2. Background Information

Machine learning is a process used to analyze data in which the dataset is used to determine a model that maps input data to output data. For example, neural networks are machine learning models that employ one or more layers of nonlinear units to predict an output for a received input. Some neural networks include one or more hidden layers in additional to an output layer. The output of each hidden layer is used as input to the next layer in the network, i.e., the next hidden layer or the output layer. Each layer of the network generates an output from a received input in accordance with current values of a respective set of parameters.

In offline learning, one can inspect historical training data to identify contextual clusters either through feature clustering or hand-crafting additional features to describe a context. While offline training enjoys the privilege of learning reliable models based on already-defined contextual features, online training (i.e., training in real time) for streaming data may be more challenging. For example, the underlying context during a machine learning process may change resulting in an under-performing model being learned due to contradictory evidence observed in data within high-confusion regimes. Furthermore, the problem is exacerbated when the number of possible contexts is not known.

SUMMARY

According to an embodiment of the present disclosure, a method of training a machine learning model is provided. Input data is received from at least one remote device. A classifier is evaluated by determining a classification accuracy of the input data. A training data matrix of the input data is applied to a selected context autoencoder of a knowledge bank of autoencoders including at least one context autoencoder and the training data matrix is determined to be out of context for the selected autoencoder. The training data matrix is applied to each other context autoencoder of the at least one autoencoder and the training data matrix is determined to be out of context for each other context autoencoder. A new context autoencoder is constructed.

In the alternative or additionally thereto, in the foregoing embodiment, the new context autoencoder is stored with the knowledge bank of autoencoders.

In the alternative or additionally thereto, in the foregoing embodiment, the new context autoencoder is initialized.

In the alternative or additionally thereto, in the foregoing embodiment, a semantic meaning is applied to the new context autoencoder.

In the alternative or additionally thereto, in the foregoing embodiment, determining the input data is out of context includes determining a reconstruction error for a respective one of the at least one context autoencoder.

In the alternative or additionally thereto, in the foregoing embodiment, the input data is out of context when $$P\left(\frac{\epsilon - \mu_\epsilon}{\sigma_\epsilon}\right) < k.$$

In the alternative or additionally thereto, in the foregoing embodiment, the input data is streaming data from the at least one remote device.

In the alternative or additionally thereto, in the foregoing embodiment, the creation of a new context autoencoder includes an alarm.

In the alternative or additionally thereto, in the foregoing embodiment, the at least one autoencoder is part of a machine learning model.

In the alternative or additionally thereto, in the foregoing embodiment, each autoencoder of the at least one autoencoder is part of a respective machine learning model of at least one machine learning model.

In accordance with another embodiment of the present disclosure, a system for context-based training of a machine learning model is provided. The system includes a memory unit and a processor unit in communication with the memory unit. The memory unit is configured to store data and processor-executable instructions. The processor unit is configured to execute the processor-executable instructions stored in the memory unit to: receive streaming data from at least one remote device; evaluate a classifier by determining a classification accuracy of the streaming data; apply a training data matrix of the streaming data to a selected context autoencoder of a knowledge bank of autoencoders including at least one context autoencoder and determine the training data matrix is out of context for the selected context autoencoder; apply the training data matrix to each other context autoencoder of the at least one autoencoder and determine the training data matrix is out of context for each other context autoencoder; and construct a new context autoencoder.

In the alternative or additionally thereto, in the foregoing embodiment, the processor unit is configured to execute the processor-executable instructions stored in the memory unit to store the new context autoencoder with the knowledge bank of autoencoders.

In the alternative or additionally thereto, in the foregoing embodiment, the processor unit is configured to execute the process-executable instructions stored in the memory unit to initialize the new context autoencoder.

In the alternative or additionally thereto, in the foregoing embodiment, the system further includes a user interface in communication with the processor unit, the user interface configured to apply a semantic meaning provided by a user to the new context autoencoder.

In the alternative or additionally thereto, in the foregoing embodiment, determining the input data is out of context includes determining a reconstruction error with a respective one of the at least one context autoencoder.

In accordance with another embodiment of the present disclosure, a system for context-based training of a machine learning model is provided. The system includes at least one sensor mounted to a vehicle, a memory unit, and a processor unit in communication with the memory unit and the at least one sensor. The memory unit is configured to store data and process-executable instructions. The processor unit is configured to execute the process-executable instructions stored in the memory unit to: receive streaming data from the at least one remote sensor; evaluate a classifier by determining a classification accuracy of the streaming data; apply a training data matrix of the streaming data to a selected context autoencoder of a knowledge bank of autoencoders including at least one context autoencoder and determine the training data matrix is out of context for the selected context autoencoder; apply the training data matrix to each other context autoencoder of the at least one autoencoder and determine the training data matrix is out of context for each other context autoencoder; and construct a new context autoencoder.

In the alternative or additionally thereto, in the foregoing embodiment, the processor unit is configured to execute the process-executable instructions stored in the memory unit to store the new context autoencoder with the knowledge bank of autoencoders.

In the alternative or additionally thereto, in the foregoing embodiment, the processor unit is configured to execute the processor-executable instructions stored in the memory unit to initialize the new context autoencoder.

In the alternative or additionally thereto, in the foregoing embodiment, the system further includes a user interface in communication with the processor unit, the user interface configured to apply a semantic meaning provided by a user to the new context autoencoder.

In the alternative or additionally thereto, in the foregoing embodiment, determining the input data is out of context includes determining a reconstruction error with a respective one of the at least one context autoencoder.

The present disclosure, and all its aspects, embodiments and advantages associated therewith will become more readily apparent in view of the detailed description provided below, including the accompanying drawings.

DETAILED DESCRIPTION

Figure 1:
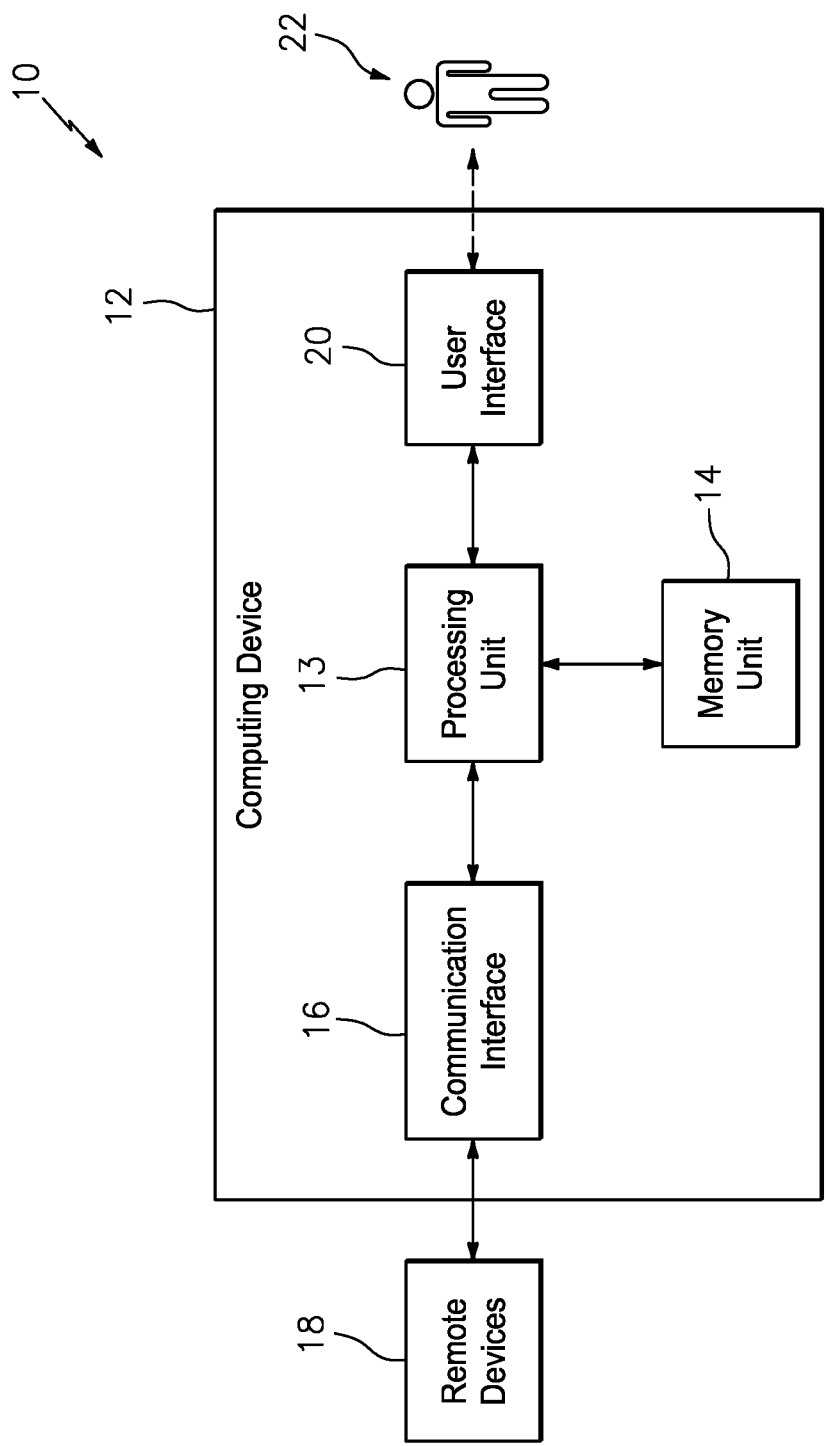
FIG. 1 is a block diagram illustrating an exemplary information processing system in which one or more aspects of the present disclosure may be implemented.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, a machine learning system 10 includes a computing device 12 having a processing unit 13 operatively coupled to a memory unit 14. The processing unit 13 is one or more devices configured to execute instructions for software and/or firmware. For example, the processing unit 13 may include one or more computer processors and/or one or more distributed computer processors. The memory unit 14 is one or more devices configured to store computer-readable information (e.g., computer programs, data, etc.). A communication interface 16 communicates with one or more remote devices 18. The one or more remote devices 18 may include, but are not limited to sensors (e.g., accelerometers, temperature and pressure detectors, etc.), cameras, mobile devices (e.g., smart phones), GPS or other locational devices, and/or any other suitable devices. The one or more remote devices 18 may provide input data (e.g., streaming data) to the processing unit 13 via the communication interface 16. To communicate with the one or more remote devices 18, the communication interface 16 may include, for example, a wired, wireless, or mobile communications network configured to transmit data from the processing unit 13 to the one or more remote devices 18 and/or from the one or more remote devices 18 to the processing unit 13.

In some embodiments, the machine learning system may also include a user interface 20 configured to receive input data from a user 22 and transmit the input data to the processing unit 13. The user interface 20 may also be configured to receive output data from the processing unit 13 and present the output data to the user 22 via one or more output means. The user interface 20 may be implemented using one or more of a touchscreen or alternative type of display, audio input or output devices, a keypad, a keyboard, a mouse, or any other suitable form of input/output device.

The performance of machine learning can be further improved if contextual cues are provided as input along with base features that are directly related to an inference task. For example, consider a non-limiting example wherein an aircraft gas turbine engine includes sensors (i.e., remote devices 18) from which engine loading can be determined. If the machine learning model is given a task to discriminate between nominal or excessive engine loading, an under-performing model may be learned because contextual features such as, for example, time, weather, and/or operating mode of the engine are not considered. For example, a particular engine load during gas turbine engine cruising operations may be an excessive load while the same engine load during a take-off operation may be a nominal load. Without distinguishing between engine contexts, training of the machine learning model may cause the model to indicate a false positive for excessive engine loading during the take-off operation. Thus, consideration of contexts may provide more useful information for an improved machine learning model thereby, for example, reducing or preventing determinations of false positives in vehicle on-board monitoring systems, as shown in the previous example. However, the number and form of possible contexts may be unknown. Thus, the machine learning system must be able to recognize both unencountered and previously encountered contexts. While the previous example relates to operation of an aircraft gas turbine engine, those of ordinary skill in the art will recognize that the present disclosure may relate to training of any number of suitable machine learning models, machine learning systems, and apparatuses using said machine learning models and systems.

Figure 2:
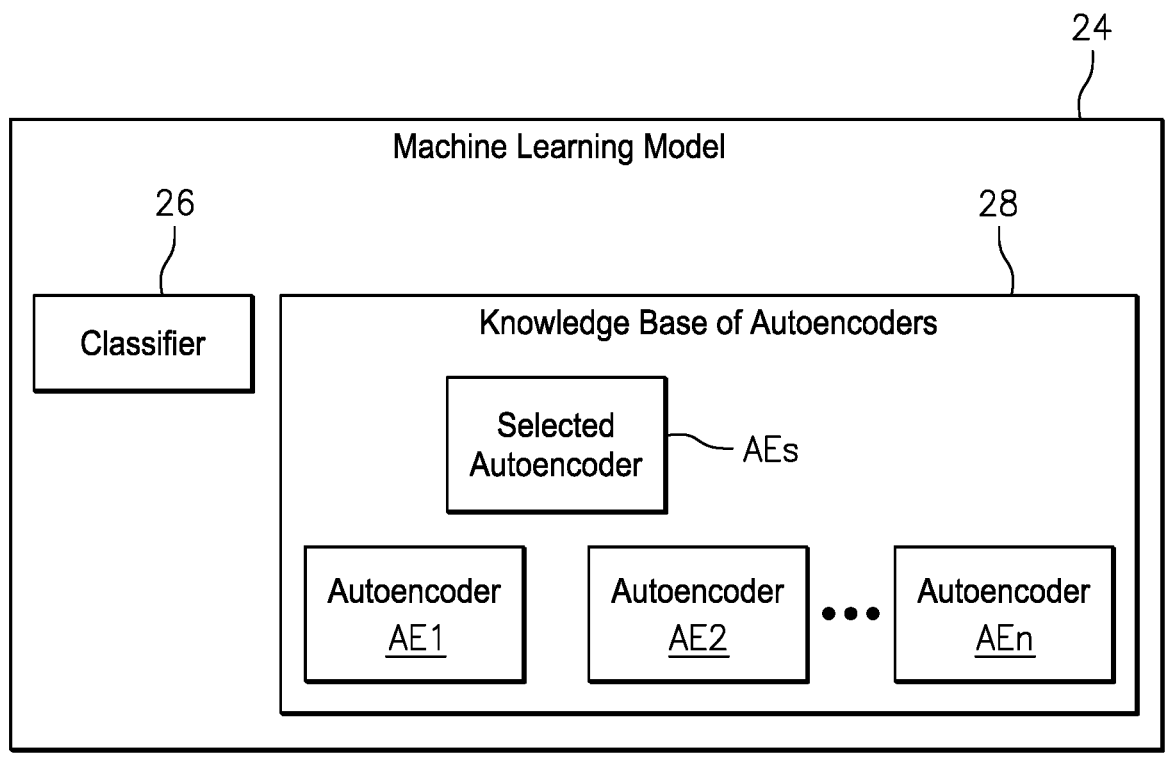
FIG. 2 is a block diagram of a machine learning model.

Referring to FIG. 2, the machine learning system 10 is configured to execute a machine learning model 24. The machine learning model 24 includes a classifier 26 configured to perform a data classification task. The machine learning model further includes a knowledge base of autoencoders 28 corresponding to the previously learned contexts of the machine learning model 24. The knowledge base of autoencoders includes at least one autoencoder AE1, AE2, . . . AEn, each autoencoder of the at least one autoencoder AE1, AE2, . . . AEn corresponding to a known context. One autoencoder of the at least one autoencoder AE1, AE2, . . . AEn may be a selected autoencoder AEs corresponding to the current context of the machine learning system 10.

Figure 3:
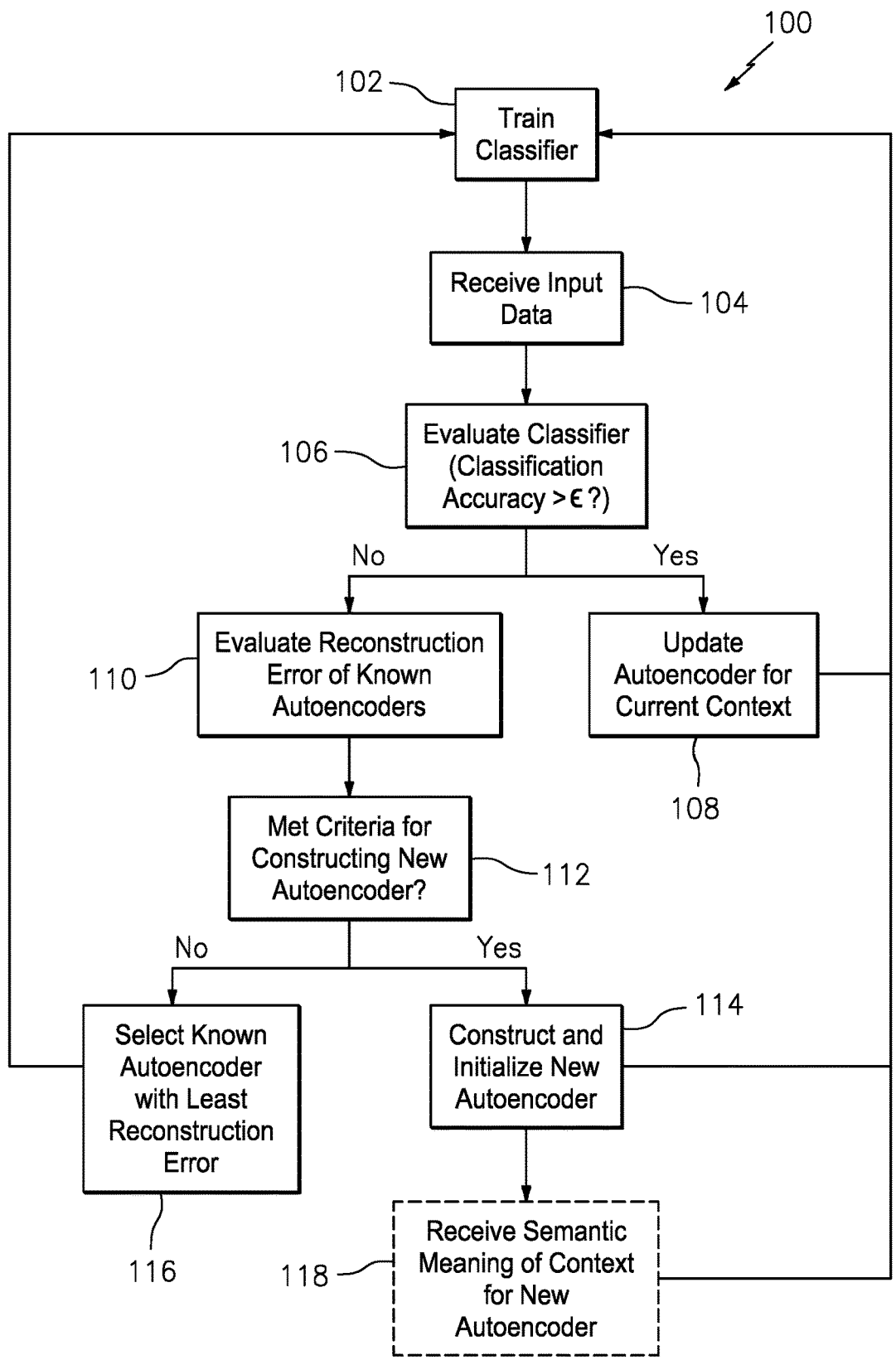
FIG. 3 is a flow chart of an exemplary method for context-based training of a machine learning model.

Referring to FIG. 3, a method 100 for implementing one or more aspects of the present disclosure will now be described. By jointly training a neural network-based autoencoder g(•) (e.g., autoencoders AE1, AE2, . . . AEn) for contextual inference and a classifier f(•) (e.g., classifier 26) for the classification task, a machine learning model (e.g., machine learning model 24) may be configured for context-aware incremental learning (see Block 102). Consider the machine learning model having an online learning task centered around data classification. During the learning phase, the selected autoencoder (e.g., autoencoder AEs) receives a training data matrix including features x and data labels y to learn the underlying representation of the features and the labels z=x⊕y. Through this approach, a nominal context representation for a particular operating mode is derived.

Input data X from remote devices (e.g., the one or more remote devices 18) or a representation of the input data such as a feature matrix, arrives as a d-dimensional vector x: $\mathcal{R}^d$ associated with the class labels y∈{0, 1} (see Block 104). At every time step t, the machine learning model receives a new input data sample to train the classifier of the machine learning model. With each newly-arriving input data sample, the classifier will perform class predictions and compare the predicted output ŷ with the supplied ground-truth label y (see Block 106). Any wrongly-classified input data will provide feedback to the machine learning model to update its learned parameters.

A context shift occurs when there is a change in the relationship between supplied features X and corresponding target values $\mathcal{Y}$. This may happen, for example, whenever there is a change in the process which results from a change in the mode of operation. Consider, for example, the operation of a gas turbine engine. Suppose in one mode of operation (e.g., take-off), monitoring specific feature X values can provide insights to the health of the engine. However, when a change occurs such that the engine is operating under a different mode (e.g., cruising), what used to be healthy may now be considered unhealthy (i.e., the decision threshold has changed which affects the labeling strategy). In such a scenario, conventional online-learning algorithms which do not incorporate context awareness may fail to adjust to the change in context.

The selected autoencoder is able to automatically learn useful features from the input data X and reconstruct the input data X based on the learned features (see Block 108). A sharp decrease of classification accuracy may indicate a potential change in concept, which may trigger the selected autoencoder to compare the representation of the new data with the average representation of the learned context computed via the autoencoders of the knowledge bank of autoencoders (see Block 110). The selected autoencoder is trained to learn a low-dimensional representation of the normal input data X by attempting to reconstruct its inputs to get X̂ with the following objective function:

$$\theta = \arg\min_{\theta} \mathcal{L}(X, g(X))$$

where θ is the parameters of the autoencoder g (i.e., weights of the neural network), $\mathcal{L}$ is the loss function (typically $\mathcal{L}_2$ loss), X is the input, and X̂=g=g(X) is the reconstruction of the autoencoder. When presented with data that comes from a different data-generating distribution, it is expected that a high reconstruction error may be observed. The reconstruction errors may be modeled as a normal distribution—an anomaly (i.e., out-of-context data) may be detected when the probability density of the average reconstruction error is below a certain predetermined threshold.

During every encounter of potential context switch, the new data sample is evaluated against a knowledge base of autoencoders $\mathcal{G} = \{g_1, g_2, g_3, \ldots, g_{n_c}\}$ to derive the reconstruction errors where $n_c$ is the number of seen (and hypothesized) contexts (see Block 110). If for all autoencoders the reconstruction error ∈=$\mathcal{L}$(z, ẑ) is above a certain predetermined threshold, then a new context is hypothesized.

One autoencoder is learned for each context as a descriptor for the training instance. If the representation is substantially different (i.e., high reconstruction error) (see Block 112), a new concept is hypothesized, where a contextual variable c is introduced as a flag for the new context. Accordingly, a new autoencoder is constructed and initialized (i.e., selected for further machine learning) consistent with the new context (see Block 114). The subsequent training data matrix will be denoted as x←x⊕c which indicates that the newly added contextual variable is now part of the training data matrix as inputs to the classifier.

Reconstruction errors may be modeled as a normal distribution. Under a fixed context, the mean $\mu_\in$ and standard errors $\sigma_\in$ of the reconstruction error specific to a context may be monitored. As previously discussed, when the online training experiences a sharp drop in classification accuracy, the current training sample z=x⊕y is passed through the autoencoder $g_i$ related to the current context to compute its reconstruction error ∈=$\mathcal{L}$(z, ẑ). Given a past history of verified samples coming from the evaluated context, $\mu_\in$ and $\sigma_\in$ may be derived. For a new sample under decreased classification accuracy, a sample may be considered as out-of-context if:

$$P\left(\frac{\epsilon - \mu_\epsilon}{\sigma_\epsilon}\right) < k$$

where k is a defined predetermined threshold. In some embodiments, a regression analysis may alternatively be used to determined whether a sample is out-of-context.

Conversely, if one of the autoencoders returns a reconstruction error falling within a predetermined threshold (e.g., based on statistical significance), then the new data sample is determined to come from a context that has been learned previously (see Block 116). For example, the context autoencoder with the least reconstruction error may be selected. Using this framework, the online-learning algorithm is able to adapt to changing contexts without requiring prior complete knowledge of the number of possible contexts present in the data.

An exemplary online-training algorithm is outlined in Algorithm 1:

---
Algorithm 1
---

Initialize current context ID, $n_c \leftarrow 1$
Initialize historical accuracies, acc $\leftarrow \phi$
Initialize classifier, $f(\cdot)$
Initialize context autoencoder, $g_1(\cdot)$
Initialize autoencoder list, $\mathcal{G} \leftarrow g_1$
Define accuracy threshold, $t \leftarrow 0.9$
Define autoencoder window, $T \leftarrow 20$
Train classifier $f(x_0:x_{t-1}, y_0:y_{t-1})$
Train autoencoder $g(x_0 \oplus y_0:x_{t-1} \oplus y_{t-1}, x_0 \oplus y_0:x_{t-1} \oplus y_{t-1})$
while Data $x_t$ is streaming do
| Make prediction, $\hat{y} \leftarrow f(x_t)$
| Evaluate accuracy, $acc_t \leftarrow I[\hat{y}, y]$
| Append accuracy to list, acc $\leftarrow$ acc$\cup acc_i$
| if mean($acc_{t-T}$:$acc_t$) > t then
|  | Select $X \leftarrow (x_0 \oplus y_0:x_t \oplus y_t |$context $= n_c)$
|  | Update autoencoder $g_{n_c} \leftarrow g(X, X)$
| else
|  | Pass $x_t \oplus y_t$ through stored list of autoencoders $g_0, g_1, \ldots, g_{n_c}$
|  | Compute $\epsilon_i$ for each $g_i$ for $i \in (0, 1, \ldots, n_c)$

|  | if $P\left(\dfrac{\epsilon_i - \mu_{\epsilon_{g_i}}}{\sigma_{\epsilon_{g_i}}}\right) < k$ then

|  |  | Update autoencoder list $G[n_c] \leftarrow g_{n_c}$
|  |  | Increment context ID $n_c \leftarrow n_c + 1$
|  |  | Initialize new autoencoder $g_{n_c}$
|  | else
|  |  | Assign context ID $n_c \leftarrow$ arg min $\epsilon_i$
|  | end
| end
end

---

Referring to FIGS. 1 and 3, in some embodiments, a user 22 may provide a semantic meaning to a learned context (see Block 118). For example, the user 22 may review the data associated with the learned context via the user interface 20 and define a semantic meaning for the learned context via the user interface 20. The semantic meaning may be, for example, a mode of operation such as a take-off or cruising context for a gas turbine engine of an aircraft. In some embodiments, the user 22 may be prompted to define a semantic meaning for a learned context by, for example, an alarm or other signal.

In some embodiments, all possible contexts for a machine learning system 10 may already be known. In such an embodiment, a context shift resulting in an evaluation of known autoencoders (see Block 112) may always result in the selection of a known autoencoder with the least reconstruction error (see Block 116).

Figure 4:
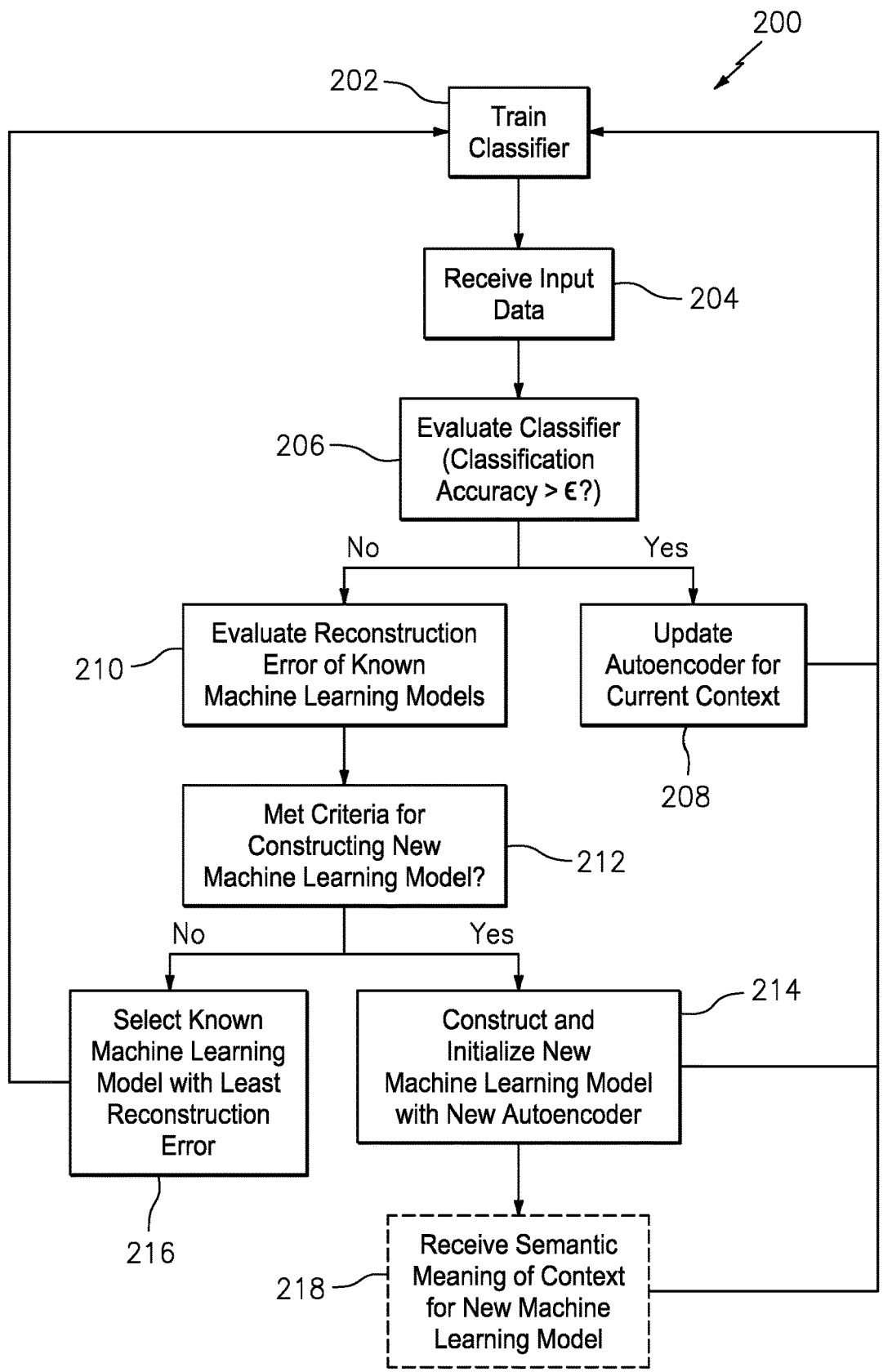
FIG. 4 is a flow chart of an exemplary method for context-based training of a machine learning model.

Referring to FIG. 4, a method 200 is disclosed similar to that discussed above with respect to FIG. 3, wherein a new machine learning model of at least one machine learning model is constructed for each learned context. The autoencoder $g(\bullet)$ is trained for contextual inference while the classifier $f(\bullet)$ for the classification task (see Block 202). Input data from remote devices or a representation of the input data such as a feature matrix, arrives as a d-dimensional vector $x$: $\mathcal{R}^d$ associated with the class labels $y \in \{0, 1\}$ (see Block 204). At every time step t, the machine learning model receives a new input data sample to train the classifier of the machine learning model. With each newly-arriving input data sample, the classifier will perform class predictions and compare the predicted output 9 with the supplied ground-truth label y (see Block 206). The autoencoder of the selected machine learning model is able to automatically learn useful features from the input data X and reconstruct the input data X based on the learned features (see Block 208). During every encounter of potential context switch, the new data sample is evaluated against each of the at least one machine learning models to derive the reconstruction errors where $n_c$ is the number of seen (and hypothesized) contexts (see Block 210). If for all of the at least one machine learning models the reconstruction error $\in = \mathcal{L}(z, \hat{z})$ is above a certain predetermined threshold, then a new context is hypothesized. One autoencoder corresponding to a new machine learning model is learned for each context as a descriptor for the training instance. If the representation is substantially different (i.e., high reconstruction error) (see Block 212), a new concept is hypothesized, where a contextual variable c is introduced as a flag for the new context (see Block 214). Conversely, if one of the machine learning models returns a reconstruction error falling within a predetermined threshold (e.g., based on statistical significance), then the new data sample is determined to come from a context that has been learned previously (see Block 216). In some embodiments, a user 22 may provide a semantic meaning to a learned context (see Block 218).

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A method of training a machine learning model, the method comprising:
   receiving input data from at least one gas turbine engine sensor;
   evaluating a classifier by determining a classification accuracy for classification of the input data by the classifier;
   jointly training the classifier and a selected context autoencoder of a knowledge bank of autoencoders including at least one autoencoder using first input data of the input data, which selected context autoencoder is one autoencoder of the knowledge bank of autoencoders, the first input data received from the at least one gas turbine engine sensor with the gas turbine engine operating in a first mode of operation;
   applying a training data matrix of second input data of the input data to the selected context autoencoder and determining the training data matrix is out of context for the selected context autoencoder, the second input data received from the at least one gas turbine engine sensor with the gas turbine engine operating in a second mode of operation which is different than the first mode of operation;
   applying the training data matrix of the second input data to each other context autoencoder of the at least one autoencoder and determining the training data matrix is out of context for each other context autoencoder; and
   constructing a new context autoencoder using the second input data such that the training data matrix of the second input data is in context for the new context autoencoder.

2. The method of claim 1, further comprising storing the new context autoencoder with the knowledge bank of autoencoders.

3. The method of claim 1, further comprising initializing the new context autoencoder.

4. The method of claim 1, further comprising applying a semantic meaning to the new context autoencoder.

5. The method of claim 1, wherein determining the training data matrix is out of context includes determining a reconstruction error for a respective one of the at least one context autoencoder.

6. The method of claim 5, wherein the input data is out of context when $$P\left(\frac{\epsilon - \mu_\epsilon}{\sigma_\epsilon}\right) < k.$$

7. The method of claim 1, wherein the input data is streaming data from the at least one gas turbine engine sensor.

8. The method of claim 4, wherein the creation of a new context autoencoder induces an alarm.

9. The method of claim 1, wherein each autoencoder of the at least one autoencoder is part of a respective machine learning model of at least one machine learning model.

10. The method of claim 1, wherein jointly training the classifier and the selected context autoencoder of the knowledge bank of autoencoders includes jointly training only the classifier and the selected context autoencoder.

11. A system for context-based training of a machine learning model for a gas turbine engine, the system comprising:
a memory unit configured to store data and processor-executable instructions;
a processor unit in communication with the memory unit, the processor unit configured to execute the processor-executable instructions stored in the memory unit to:
receive streaming data from at least one sensor for the gas turbine engine;
evaluate a classifier by determining a classification accuracy for classification of the streaming data by the classifier;
jointly train the classifier and a selected context autoencoder of a knowledge bank of autoencoders including at least one autoencoder using first input data of the streaming data, which selected context autoencoder is one autoencoder of the knowledge bank of autoencoders, the first input data received from the at least one sensor with the gas turbine engine operating in a first mode of operation;
apply a training data matrix of second input data of the streaming data to the selected context autoencoder and determine the training data matrix is out of context for the selected context autoencoder, the second input data received from the at least one sensor with the gas turbine engine operating in a second mode of operation which is different than the first mode of operation;
apply the training data matrix of the second input data to each other context autoencoder of the at least one autoencoder and determine the training data matrix is out of context for each other context autoencoder; and
construct a new context autoencoder using the second input data such that the training data matrix of the second input data is in context for the new context autoencoder.

12. The system of claim 11, wherein the processor unit is configured to execute the processor-executable instructions stored in the memory unit to store the new context autoencoder with the knowledge bank of autoencoders.

13. The system of claim 11, wherein the processor unit is configured to execute the processor-executable instructions stored in the memory unit to initialize the new context autoencoder.

14. The system of claim 11, further comprising a user interface in communication with the processor unit, the user interface configured to apply a semantic meaning provided by a user to the new context autoencoder.

15. The system of claim 11, wherein determining the streaming data is out of context includes determining a reconstruction error with a respective one of the at least one context autoencoder.

16. A system for context-based training of a machine learning model, the system comprising:
at least one sensor mounted to a gas turbine engine of a vehicle;
a memory unit configured to store data and processor-executable instructions;
a processor unit in communication with the memory unit and the at least one sensor, the processor unit configured to execute the processor-executable instructions stored in the memory unit to:
receive streaming data from the at least one remote sensor, the streaming data including engine loading data for the gas turbine engine;
evaluate a classifier by determining a classification accuracy for classification of the streaming data by the classifier;
jointly train the classifier and a selected context autoencoder of a knowledge bank of autoencoders including at least one autoencoder using the streaming data, which selected context autoencoder is one autoencoder of the knowledge bank of autoencoders;
apply a training data matrix of the streaming data to the selected context autoencoder and determine the training data matrix is out of context for the selected context autoencoder;
apply the training data matrix to each other context autoencoder of the at least one autoencoder and determine the training data matrix is out of context for each other context autoencoder; and
construct a new context autoencoder.

17. The system of claim 16, wherein the processor unit is configured to execute the processor-executable instructions stored in the memory unit to store the new context autoencoder with the knowledge bank of autoencoders.

18. The system of claim 16, wherein the processor unit is configured to execute the processor-executable instructions stored in the memory unit to initialize the new context autoencoder.

19. The system of claim 16, further comprising a user interface in communication with the processor unit, the user interface configured to apply a semantic meaning provided by a user to the new context autoencoder.

20. The system of claim 16, wherein determining the streaming data is out of context includes determining a reconstruction error with a respective one of the at least one context autoencoder.

* * * * *